United States Patent [19]
Wittenmayer et al.

[11] Patent Number: 5,153,388
[45] Date of Patent: Oct. 6, 1992

[54] SOUND INSULATING ELEMENT HAVING ABSORPTION PROPERTIES FOR PARTITION WALLS

[75] Inventors: Klaus Wittenmayer, Uetze; Rainer Prütz, Adelheidsdorf, both of Fed. Rep. of Germany

[73] Assignee: Dr. Alois Stankiewicz GmbH, Adelheidsdorf, Fed. Rep. of Germany

[21] Appl. No.: 271,110

[22] Filed: Nov. 14, 1988

[30] Foreign Application Priority Data

Nov. 13, 1987 [DE] Fed. Rep. of Germany ... 8715142[U]

[51] Int. Cl.$^5$ .............................. E04B 1/82
[52] U.S. Cl. ..................... 181/290; 181/294
[58] Field of Search ............... 181/207–209, 181/290–294; 428/319.7

[56] References Cited

U.S. PATENT DOCUMENTS

| | | | |
|---|---|---|---|
| 3,160,549 | 12/1964 | Caldwell et al. | 181/207 X |
| 4,476,183 | 10/1984 | Holtrop et al. | 428/319.7 X |
| 4,574,915 | 3/1986 | Gahlau et al. | 181/290 |
| 4,800,984 | 1/1989 | Kerman | 181/290 |
| 4,825,974 | 5/1989 | Hoffmann et al. | 181/290 |

FOREIGN PATENT DOCUMENTS 3440701 5/1986 Fed. Rep. of Germany.
3510932 4/1987 Fed. Rep. of Germany.

Primary Examiner—Benjamin R. Fuller
Assistant Examiner—Alrick Bobb
Attorney, Agent, or Firm—Scully, Scott, Murphy & Presser

[57] ABSTRACT

An air-borne sound insulating arrangement with absorption properties for surface elements, in particular for partition walls in motor vehicles, comprises a heavy layer which has foam layers on both sides which have skins on the outside or have a foil as a covering. The arrangement is arranged so close to the surface element (sheet 1) to be protected that the distance between the heavy layer and the surface element is as small as possible. Adhesion to the surface element does not take place. The arrangement can rest against the surface element or can be at a short distance therefrom so as to even out corrugations or the like. The arrangement is arranged in the desired position in relation to the surface element by means of fastening bolts and/or fastenings at the edges.

14 Claims, 1 Drawing Sheet

SOUND INSULATING ELEMENT HAVING ABSORPTION PROPERTIES FOR PARTITION WALLS

TECHNICAL FIELD OF THE INVENTION

The invention relates to a sound insulating element having absorption properties for a partition wall.

BACKGROUND OF THE INVENTION AND PRIOR ART

In order to produce an acceptably low noise level in the interior of a motor vehicle such as a passenger vehicle it is known to provide preferably the dash panel-floor region of the interior of the vehicle with sound insulating coverings. It is further known to also use sound insulation on the engine compartment side. According to DE-OS 34 40 701 a heavy layer is used for this purpose having different surface masses and different acoustic effects such as structure-borne sound dampening and air-borne sound insulating, possibly also in conjunction with an air-borne sound absorber on the engine compartment side. Such arrangements are securely fixed to the substrate, in this case to the body panel, namely the partition wall between the interior of the vehicle and the engine compartment which contains the sound source. For this purpose it is necessary to melt the arrangement on by means of a heat melting adhesive or to affix it in the usual manner by means of an ordinary adhesive. In both cases additional mechanical supports are often necessary.

This kind of arrangement is expensive owing to the difficult method of application wherein it must further be taken into consideration that dimensional requirements based on the design must be met.

OBJECT OF THE INVENTION

On this basis it is an object of the present invention to design a sound insulating element having absorption properties so that while meeting design requirements it is possible to arrange it in the desired position next to the partition wall in an economical way.

BRIEF DESCRIPTION OF THE INVENTION

An important feature of the invention is that it is sufficient to support or to hold the arrangement according to the invention in position mechanically; additional adhesives or the like are superfluous. By this means it is possible to achieve very economical assembly.

The arrangement according to the specification comprises a thin foam layer facing the sheet metal or other surface element, a subsequent heavy layer thereon and an air-borne sound absorber laminated or foamed (backed foam) on to this. The laminated absorber is preferably also a foam layer such as a thermally compressed foam. Both, the foam facing the surface element and the foam facing the sound source (the engine), are covered by thin foils which serve both to block out moisture and increase the acoustic effectiveness: this applied in particular to the covering of the foam on the sound source side. Owing to the design requirements the mounting depth of the arrangement is generally limited to 10 to 30 mm, preferably 20 to 25 mm. The acoustic effect of such thin arrangements is therefore also appreciably limited, in particular when, with the present invention, the hitherto conventional melting-on processes, which lead to additional benefit from structure-borne sound damping properties, are dispensed with. Until now, in order to overcome these problems, other methods have had to be used, for example making the foam layer facing the surface element adhesive, according to DE-PS 35 10 932. A firm connection, such as by adhesion, is however not necessary in the present invention. The arrangement according to the application can be attached to fastening pins or bolts and/or held around the edges.

It is to be noted that owing to the heavy layer being very close to the sheet metal, but separated from the surface element by the foam on the surface element side (by the elastic spring), a double-wall system results which in itself has unfavorable properties for the vehicle acoustics. For example, owing to the close frequency match in respect of the resonance frequency, the low-frequency components which arise from the ignition frequency of the engine, are practically only influenced by the so-called mass effect. In the high frequency region above the resonance frequency acoustic losses have to be taken into account, which show up as reduced comprehensibility of speech. Through the specific arrangement, according to the application, of the elastic spring on the heavy layer, through the spacing of the heavy layer from the surface element, and through the omission of adhesion, i.e. of a fixed connection to the surface element, these expected disadvantages are surprisingly avoided. A further important feature is that while the air-borne sound insulating arrangement can be arranged so close to the surface element that the covering on the surface element side can be in contact with the surface element, this is not necessary, so that corrugations or the like in the surface element can be evened out in a simple manner. Owing on the one hand to the inherent stiffness and on the other hand to the residual elasticity, the arrangement more or less follows the course of such corrugations so that the distance between the heavy layer and the surface element (when the foam layer has a thickness of about 5 mm) does not exceed 7 mm.

BRIEF DESCRIPTION OF THE DRAWINGS

The invention will now be described in more detail with reference to an exemplary embodiment shown in the drawings, in which.

DETAILED DESCRIPTION OF A PREFERRED EMBODIMENT OF INVENTION

The invention will be described with reference to its use in a motor vehicle, in particular the sound absorption of noise produced by an engine M in relation to the inner space I of a motor vehicle, where, between the interior space I and the space in the motor vehicle containing the noise source, a sheet 1 is provided as a surface element, this body panel 1 generally having a thickness between 0.8 and 1 mm.

Figure 1:
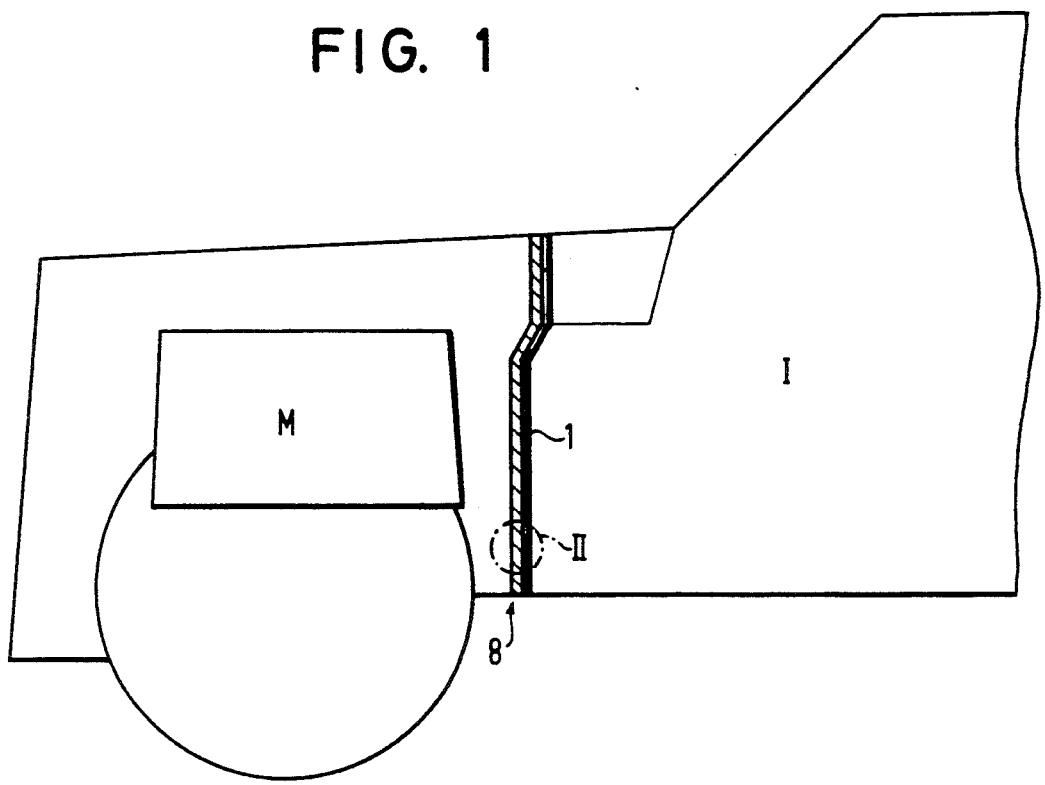
FIG. 1 shows diagrammatically in section, the arrangement of an air-borne sound insulating arrangement according to the invention on the engine compartment side.
Figure 2:
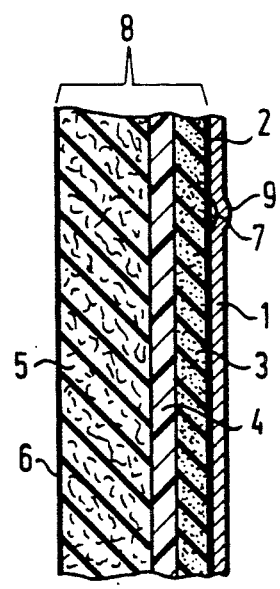
FIG. 2 shows the detail II from FIG. 1, namely the air-borne sound insulating arrangement in section.

Attached thereto and facing the space with the noise source M as shown in FIG. 1, is an air-borne sound insulating arrangement 8 formed according to the invention which either lies close to it or at a small distance from it corresponding to the gap 7, e.g. to bridge a seam or corrugation 9 in the sheet 1.

This arrangement 8 has, facing the sheet 1, a foil 2 acting as moisture barrier to the subsequent foam 3 and having a thickness of about 18 to 22 μm. However, a surface layer for instance of a polyurethane skin, can also be selected.

To this foil is attached, as already mentioned, a foam layer 3, preferably having a thickness of about 5 mm. This can comprise cut pieces of foam or a foam molding acting as an acoustic spring both for leveling the contours and avoiding rattling noises in the subsequent heavy layer 4 on the sheet 1.

As already mentioned this is followed by a heavy layer 4, preferably with a surface mass between 5 and 7 kgm$^{-2}$. The heavy layer is preferably made on a polypropylene basis (EPDM-EVA). For use in the present example, namely in the region of the engine compartment, the heavy layer 4 must be highly resistant to thermal deformation, so that its self-supporting properties are not lost even in the case of the expected exposure to temperatures of up to 130° C. When there are particular requirements for resistance to thermal deformability the heavy layer 4 can be made on a polyamide basis or on a polyurethane RIM basis so that self-supporting properties up to 170° C. are obtained. Owing to the selected material basis, such heavy layers 4 can be manufactured economically by an injection molding or RIM process so that there is the further advantage that necessary fastening elements can themselves be attached to the heavy layer 4.

Following the heavy layer 4 is a further foam layer 5 which has absorbing properties. The foam layer 5 preferably consists of cut foam with a density of 30 kgm$^{-3}$. A foam molding or a thermally molded fibrous material, such as e.g. resinated cotton (fiber cotton fleece), glass wool (fiber glass), basalt, rock wool etc. can also be used with very good acoustic results if its density lies in the region of 40 kgm$^{-3}$. Experimental results show that molded foams having densities up to 150 kgm$^{-3}$ can also be used, but with higher densities the absorption properties decrease but the sound insulating is improved. To sum up, with lighter embodiments of the foam in the foam layer 5, there is improved, namely reduced, interior noise in the passenger compartment I.

Facing the sound source, the engine M in FIG. 1, on the foam layer 5 is a covering 6 of polyester fleece having a surface mass of 150 gm$^{-2}$ or of polyurethane foil having a thickness of 25 μm.

The arrangement 8 can be connected to the sheet 1 by means of fastening bolts (not shown); it can be clamped around the edges. It is important that the arrangement 8 is not stuck to the sheet 1: in this way considerable assembly costs are avoided. The structure of the arrangement 8 described enables the heavy layer 4 to be manufactured by an injection molding or RIM process with foam backing on both sides to apply the two foam layers 3 and 5. This procedure is particularly advantageous for large-scale series manufacture. Small-scale series manufacture can be carried out economically with the same effect if the heavy layer 4 is produced by the deep-drawing method and the foam layers are obtained by means of thermally compressed foams. In the same manner fibrous materials (fleece) having suitable acoustic properties can also be used.

The arrangement according to the specification is generally suitable for the sound insulation of partition walls between a noise producer and a space to be protected. It is of particular advantage in the automobile industry for the sound insulation of the partition wall of a motor vehicle on the engine compartment side. This improved sound insulation on the engine compartment side satisfies a great need in the automobile industry, which must use all available surfaces to reduce external noise and produce the lightest possible inner insulation to reduce interior noise. The effects of the external and internal insulation must be adapted to one another. This is ensured by the present invention wherein surprisingly, with a thinning in the inner insulation, at the same time an improved sound comfort is achieved compared with the state of the art.

What is claimed is:

1. A sound insulating element having airborne sound absorption properties for a covering of a surface element, said sound insulating element comprising a heavy layer selected from the group of materials consisting of a polypropylene base, a polyamide base and a polyurethane base, said heavy layer having a foam layer arranged on both sides thereof, a thin moisture barrier covering a surface on respectively each outer side of said foam layers distant from said heavy layer, one said foam layer facing towards a sound source and forming a noise absorber and the other said foam layer facing a space towards said surface element, said other foam layer being separated from said sound source and forming an acoustic spring, said sound insulating element being self supporting and resistant to thermal deformation and being arranged in non-adhered contact with the surface element.

2. A sound insulating element according to claim 1, wherein the heavy layer has a surface mass which lies within a range of 5 to 7 kgm$^{-2}$ and the foam layer acting as an acoustic spring has a thickness of about 5 mm.

3. A sound insulating element according to claim 1 wherein the foam layer acting as an absorber and facing said sound source comprises a foam material with a density within a range of about 30 kgm$^{-3}$ to 150 kgm$^{-3}$.

4. A sound insulating element according to claim 1 wherein at least one of the foam layers comprises fibrous material with specified suitable acoustic properties.

5. A sound insulating element according to claim 1 wherein the heavy layer is at a distance of up to 7 mm from the surface element.

6. A sound insulating element according to claim 1 which is held spanned over the surface element.

7. A sound insulating element according to claim 1, wherein said surface element comprises a partition wall.

8. A sound insulating element according to claim 7, wherein said element is fixed to the partition wall at an edge of said wall.

9. A sound insulating element according to claim 7, wherein the partition wall separates a passenger compartment from an engine compartment of a motor vehicle.

10. A sound insulating element according to claim 1 wherein the surface element is situated between said sound source and said space.

11. A sound insulating element according to claim 1, wherein at least one of the foam layers comprises fleece material with suitable acoustic properties.

12. A sound insulating element according to claim 3, wherein said foam material is a thermally molded foam having a density within a range of about 40 kgm$^{-3}$ to 50 kgm$^{-3}$.

13. A sound insulating element according to claim 12, wherein said foam material has a density within a range of about 40 kgm$^{-3}$ to 50 kgm$^{-3}$.

14. A sound insulating element according to claim 3, wherein said foam material is a cut foam having a density of about 30 kgm$^{-3}$.

* * * * *